US011458881B2

(12) United States Patent
Vianello

(10) Patent No.: US 11,458,881 B2
(45) Date of Patent: Oct. 4, 2022

(54) SYSTEM AND METHOD TO ANCHOR A POSITION DETECTOR OF A VEHICLE TO A SUPPORT PLANE

(71) Applicant: TEXA S.P.A., Monastier di Treviso (IT)

(72) Inventor: Bruno Vianello, Monastier di Treviso (IT)

(73) Assignee: TEXA S.P.A., Monastier di Treviso (IT)

( * ) Notice: Subject to any disclaimer, the term of this patent is extended or adjusted under 35 U.S.C. 154(b) by 0 days.

(21) Appl. No.: 17/223,487

(22) Filed: Apr. 6, 2021

(65) Prior Publication Data

US 2021/0309142 A1 Oct. 7, 2021

(30) Foreign Application Priority Data

Apr. 7, 2020 (IT) .......................... 202020000001495

(51) Int. Cl.
*B60P 7/08* (2006.01)
(52) U.S. Cl.
CPC ....... *B60P 7/0807* (2013.01); *B60Y 2400/404* (2013.01)
(58) Field of Classification Search
CPC .............................. B60P 7/0807; G01B 11/27
USPC ............ 410/117, 118, 96, 97, 100; 701/33.1
See application file for complete search history.

(56) References Cited

U.S. PATENT DOCUMENTS

| 2008/0072444 | A1 | 3/2008 | Harrill et al. |
| 2012/0086941 | A1* | 4/2012 | Hayes ................... G01M 11/061 356/399 |
| 2013/0325252 | A1* | 12/2013 | Schommer ............ G01S 7/4972 701/33.1 |
| 2020/0182636 | A1* | 6/2020 | Ningthoujam ... G08G 1/096725 |
| 2021/0124368 | A1* | 4/2021 | Viswanathan ............ G06T 7/12 |

FOREIGN PATENT DOCUMENTS

| CN | 108 533 895 | 9/2018 |
| DE | 10 2010 062696 | 6/2012 |
| DE | 10 2016 216422 | 3/2018 |

* cited by examiner

*Primary Examiner* — D Glenn Dayoan
*Assistant Examiner* — Sunsurraye Westbrook
(74) *Attorney, Agent, or Firm* — Leason Ellis LLP

(57) ABSTRACT

An anchoring system designed to anchor a position detector on a support plane in a predetermined lateral position relative to a vehicle. The anchoring system comprises a positioning plate, which is firmly fixed on the support plane in the predetermined lateral position, a flat base, which is firmly fixed to the position detector and is designed, in use, to be laid on the positioning plate, magnetic devices, which are arranged on the flat base and on the positioning plate and are structured so as to magnetically attract one another so as to firmly anchor, though in a removable manner, the base of the position detector on the positioning plate.

15 Claims, 3 Drawing Sheets

SYSTEM AND METHOD TO ANCHOR A POSITION DETECTOR OF A VEHICLE TO A SUPPORT PLANE

CROSS-REFERENCE TO RELATED APPLICATIONS

This patent application claims priority from Italian utility model application no. 202020000001495 filed on Apr. 7, 2020, the entire disclosure of which is incorporated herein by reference.

TECHNICAL FIELD

The invention relates to a system and a method to anchor a position detector of a vehicle to a support plane.

The invention preferably relates to a system to firmly fix/anchor, though in an easily removable (separable) manner, a position detector, which can preferably be used to position a vehicle relative to panels or target tables used for the calibration of ADAS (Advanced Driver Assistance Systems) components present in the vehicle, to which explicit reference will be made in the description below without because of this loosing in generality.

PRIOR ART

Position detectors are known, which are designed to position/align vehicles relative to target tables used to calibrate ADAS cameras and radars of the vehicle.

Said position detectors are arranged on the sides of the vehicle and are designed to determine the correct positioning thereof in order to carry out the calibration of ADAS components through the aforesaid target tables.

In use, the vehicle is placed in a vehicle station in front of the target panel, which is mounted on a relative support structure of a calibration system.

Said position detectors determine the position of the vehicle in the vehicle station and communicate it to the support structure of the calibration system. The support structure is moved in a controlled manner so as to align the target panel with the vehicle. The positioning of the vehicle relative to the calibration table and to the relative structure depends on the type of vehicle undergoing the ADAS calibration. As a consequence, the predetermined positioning of the position detectors in the vehicle station can be subjected to changes based on the type of vehicle. In these cases, said position detectors must be placed back in the predetermined position. These repositioning operations, besides being complicated to be carried out and, consequently, requiring time, can however be affected by imprecisions, which introduce vehicle-target alignment errors and affect the correctness and, hence, the precision of the calibration of the ADAS components of the vehicle.

DESCRIPTION OF THE INVENTION

Therefore, the object of the invention is to provide a system that allows operators to connect/anchor position detectors in a precise and quick manner.

According to the invention, there are provided a method and a system to anchor a position detector according to the respective appended claims.

The appended claims describe preferred embodiments of the invention and form an integral part of the description.

BRIEF DESCRIPTION OF THE DRAWINGS

The invention will now be described with reference to the accompanying drawings, showing a non-limiting embodiment thereof, wherein.

PREFERRED EMBODIMENT OF THE INVENTION

Figure 1:
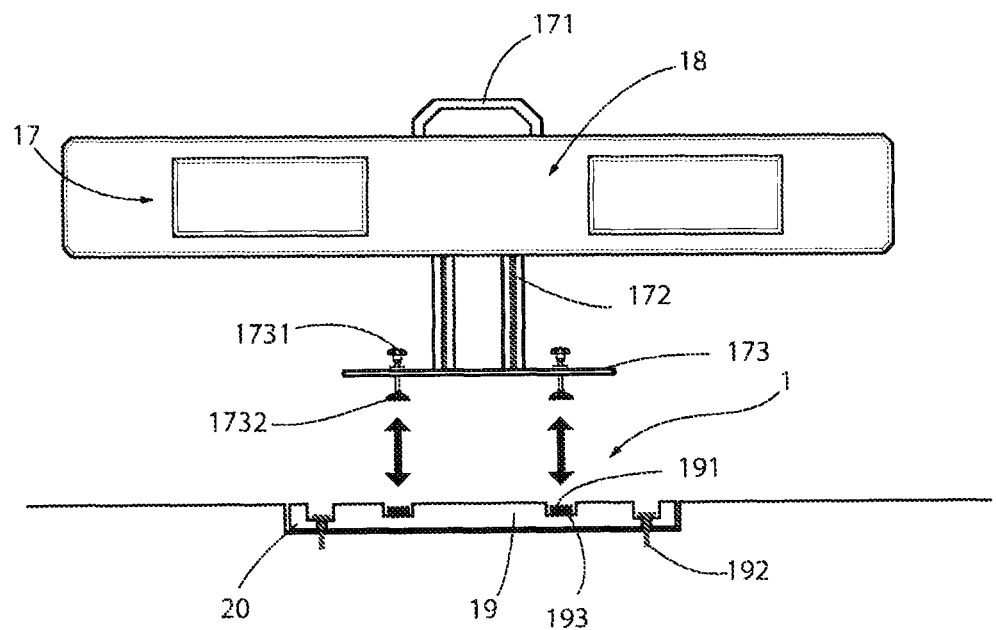
FIG. 1 is a front view, with sectional parts and parts removed for greater clarity, of an anchoring system for position detectors according to an embodiment of the invention.
Figure 2:
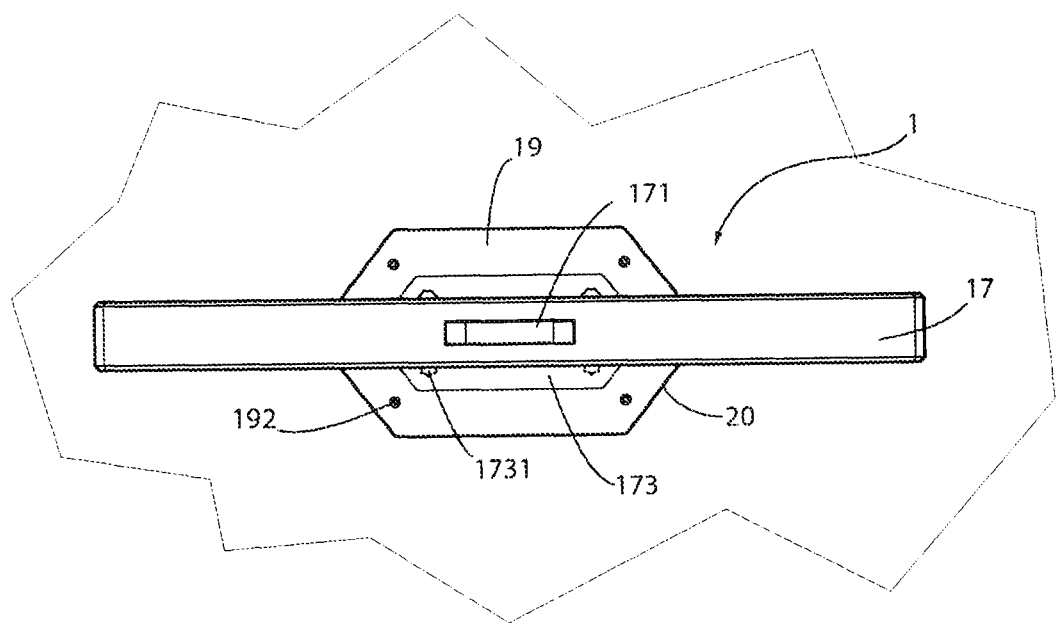
FIG. 2 is a top view, with sectional parts and parts removed for greater clarity, of an anchoring system for position detectors according to an embodiment of the invention.
Figure 3:
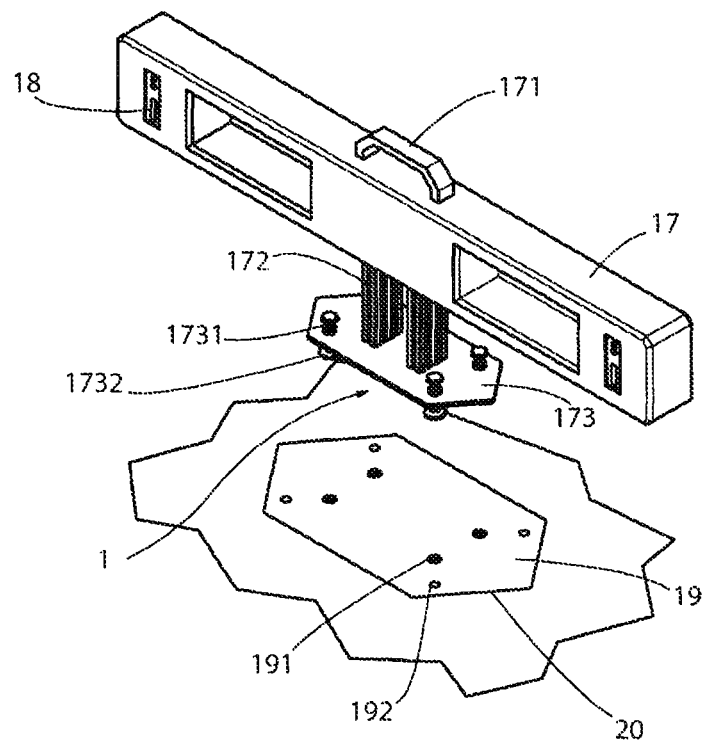
FIG. 3 is a perspective view, with sectional parts and parts removed for greater clarity, of an anchoring system for position detectors according to an embodiment of the invention.
Figure 4:
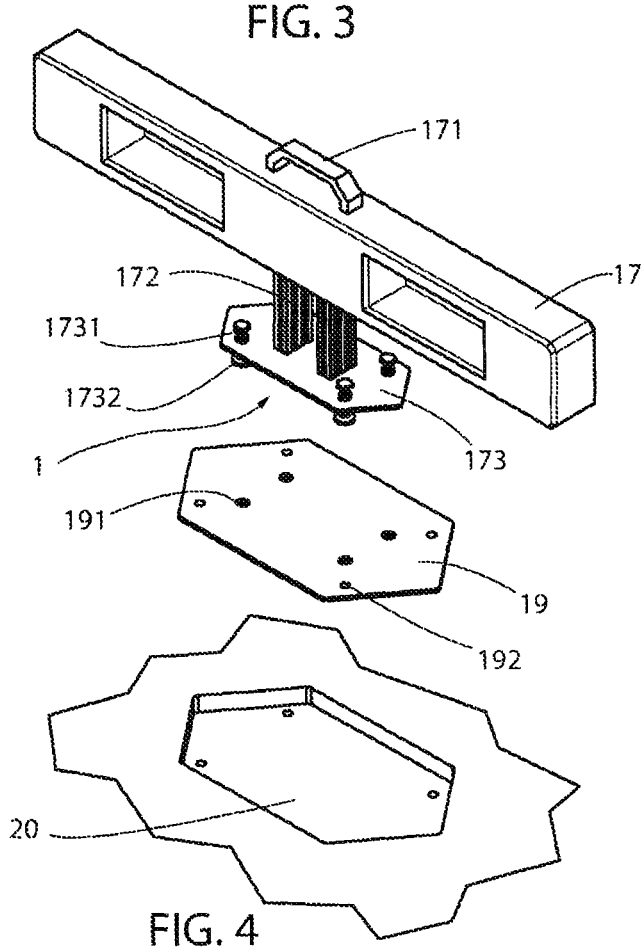
FIG. 4 is an exploded perspective view, with sectional parts and parts removed for greater clarity, of an anchoring system for position detectors according to an embodiment of the invention.
Figure 5:
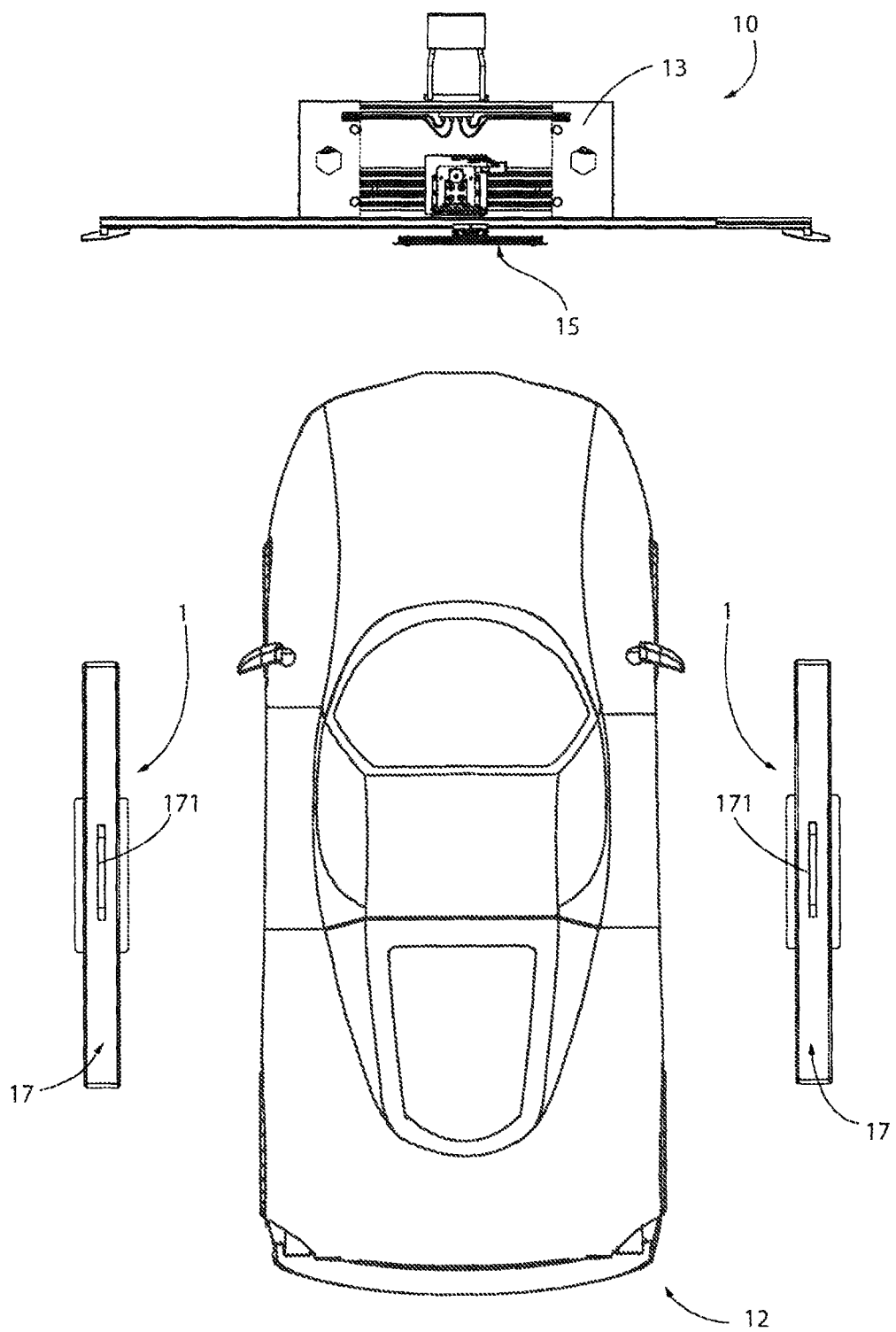
FIG. 5 is an explanatory and schematic top view of two position detectors provided with relative anchoring systems according to an embodiment of the invention.

With reference to FIGS. 1-5, number 1 indicates, as a whole, an anchoring system, which is designed to clamp one or more position detectors 17 to a support plane of a vehicle station.

According to an embodiment, the position detectors 17 may comprise at least one alignment sensor 18. The alignment sensor 18 may be designed to be used to measure the positioning of a vehicle 12 in the vehicle station. The position detectors 17 can comprise at least one optoelectronic sensor. In the example shown in FIG. 5, the vehicle 12 is placed in front of a target panel 15 arranged on the support structure of an ADAS calibration apparatus 10. The ADAS calibration apparatus 10 is provided with a base 13 resting on the support plane of the vehicle station so that the target panel 15 is in front of the vehicle 12. The ADAS calibration apparatus 10 is designed to use the target panel 15 to calibrate one or more ADAS components (not shown) present in the vehicle 12. The ADAS components can comprise, for example, cameras, radars or the like.

The position detectors 17 are arranged on the sides of the vehicle 12 and are connected to the target panel or panels 15 so as to move it/them based on the position information received from the alignment sensors 18.

In other words, the ADAS calibration apparatus 10 controls the movements of a target panel 15 based on the position information communicated by the position detectors 17. Preferably, the position detectors 17 are conveniently provided with handles 171 to transport and position them around the vehicle.

Advantageously, the aforesaid position detectors 17 have at least one height-adjustable foot 172, which helps the position detector 17 be correctly positioned on the support plane, for example the ground of the repair shop.

Said at least one foot 172 is connected, in an opposite position relative to the detector 17, to a flat base 173 with a substantially polygonal shape, in particular with a hexagonal shape.

The flat base 173 has at least one anchoring means 1731 and, in preferred embodiments, there advantageously are four anchoring means so as to increase the stability of the centre of gravity of the system.

Advantageously, the aforesaid at least one anchoring means 1731 is located in the area of the peripheral zone of the base 173.

In particular, in the area of said at least one anchoring means 1731 and in a position opposite the latter relative to the base 173 there is at least one first magnet 1732, which helps the position detector 17 be anchored.

In preferred embodiments, the anchoring system comprises four first magnets 1732. Furthermore, in the area of the support plane there is at least one positioning plate 19, which serves as base for the positioning of the position detector 17.

Advantageously, the aforesaid positioning plate 19 has at least one notch 193 to house at least one second magnet 191 arranged in the area of and facing said at least one first magnet 1732 as well as, advantageously, with an opposite polarity relative to the latter, so as to ensure an easy and firm clamping—of the fast-lock type—of the position detector 17 on the positioning plate 19. The aforesaid positioning plate 19 further has fixing means 192 to be firmly fixed to the aforesaid support plane so that the position detector 17 is not affected by possible slope changes and/or discontinuities in the support plane.

In preferred embodiments, the aforesaid positioning plate 19 is anchored, by means of the aforesaid fixing means 192, inside a recess 20 obtained in strategic positions of the support plane so as to ensure a greater stability of the system as a whole.

Therefore, the invention relates to an anchoring system 1 designed to anchor a position detector 17 on a support plane in a predetermined lateral position relative to a vehicle 12.

The anchoring system 1 comprises: a positioning plate 19, which is firmly fixed on the support plane in the predetermined lateral position, a flat base 173, which is firmly fixed to the position detector 17 and is designed, in use, to be laid on the positioning plate 19, magnetic devices 1732 and 191, which are arranged on the flat base 173 and on the positioning plate 19 and are structured so as to magnetically attract one another so as to firmly anchor, though in an easily removable (separable) manner, the position detector 17 on the support plane through the positioning plate 19. Preferably, the magnetic means 1732 and 191 comprise one or more first magnets 1732, which are steadily arranged in the base 173, and one or more second magnets 191, which are steadily arranged on the positioning plate 19. The second magnets 191 and the first magnets 1732 have opposite magnetic polarities.

The second magnets 191 can be arranged on the positioning plate 19 so as to be vertically aligned with the respective first magnets 1732 of the base 173, when the base 173 rests on the positioning plate 19.

Preferably, the anchoring system 1 comprises mechanical members 1731, which are provided with vertical stems going through the base 173, for example through holes.

The mechanical members 1731 can be used to mechanically fix the base 173 on the positioning plate 19. The second magnets 191 are arranged in respective notches 193 obtained on the positioning plate 19.

The first magnets 1732 are arranged at the lower end of the stems of the mechanical members 1731 so as to engage the relative notches 193 when the base 173 is laid on said positioning plate 19.

Furthermore, a seat or recess 20 is provided, which is obtained on the support plane. The seat 20 is designed to accommodate the positioning plate 19.

The system 1 further comprises mechanical fixing means 192 to firmly fix the positioning plate 19 to the support plane in the seat or recess 20.

The position detector 17 is configured to determine the position of the vehicle 12 relative to the target panel 15, which is designed to calibrate ADAS components present in the vehicle 12. The position detector 17 is provided with an alignment sensor 18 to determine the position of the vehicle 12 placed in the vehicle station in front of at least said target panel 15 suited for the calibration of the ADAS components of the vehicle 12.

As to the method to anchor the position detector 17 on the support plane, the following steps are provided: providing the positioning plate 19, which is suited to be laid on the support plane, providing a base 173 of the position detector 17, and providing the magnetic devices 1732 and 191 on the flat base 173 and on the positioning plate 19.

The method further comprises the step of firmly fixing the positioning plate 19 on the support plane in the predetermined lateral position and laying the base 173 on the positioning plate 19 so that the magnetic devices 1732 and 191 magnetically attract one another, in order to firmly anchor, though in an easily removable manner, the base 173 of the position detector 17 to the support plane through the positioning plate 19.

The method further comprises the step of: steadily providing one or more first magnets 1732 on the base 173, steadily providing one or more second magnets 191 on the positioning plate 19. The method further comprises the step of providing one or more second magnets 191 on the positioning plate 19 so that the second magnets 191 are vertically aligned with the respective first magnets 1732 of the base 173.

The system described above is advantageous since it makes the coupling of the position detector to the support plane quick, simple and precise. Furthermore, the position detector can be removed from the vehicle station, thus eliminating the volume occupied by it.

The invention claimed is:

1. An anchoring system (1) designed to clamp a position detector (17) on a support plane in a predetermined lateral position relative to a vehicle (12),
   said anchoring system (1) being characterized in that it comprises:
   a positioning plate (19), which is firmly fixed on the support plane in the predetermined lateral position,
   a flat base (173), which is firmly fixed to said position detector (17) and is designed, in use, to be laid on the positioning plate (19),
   magnetic means (1732) (191), which are arranged on said flat base (173) and on the positioning plate (19) and are structured so as to magnetically attract one another so as to firmly clamp, though in an easily removable manner, the base (173) of the position detector (17) on the positioning plate (19).

2. The anchoring system according to claim 1, wherein the magnetic means (1732) (191) comprise
   one or more first magnets (1732), which are steadily arranged on said base (173),
   one or more second magnets (191), which are steadily arranged on said positioning plate (19) and have opposite magnetic polarities relative to the polarities of the respective one or more first magnets (1732).

3. The anchoring system according to claim 2, wherein said one or more second magnets (191) are arranged on the positioning plate (19) so as to be vertically aligned with the respective one or more first magnets (1732) of the base (173), when the base (173) rests on the positioning plate (19).

4. The anchoring system according to claim 3 comprising mechanical members (1731), which are provided with vertical stems going through said base (173) and operate to mechanically fix the base (173) on the positioning plate (19), said one or more second magnets (191) are arranged in respective notches (193) obtained on said positioning plate (19);

said first magnets are arranged at the lower end of said stems so as to engage said notches (193) when the base (173) is laid on said positioning plate (19).

5. The anchoring system according to claim 4, comprising a seat (20), which is obtained on said support plane and is designed to accommodate said positioning plate (19), and mechanical devices (192) to firmly fix said positioning plate (19) to said support plane in said seat (20).

6. The anchoring system according to claim 1, wherein said position detector (17) is configured to determine the position of a vehicle (12) relative to the target panel (15), which is designed to calibrate ADAS components present in the vehicle (12), said position detector (17) is provided with an alignment sensor (18) to determine the position of said vehicle (12) placed in the vehicle station (12) in front of at least one target panel (15) designed for the calibration of the ADAS components of said vehicle (12).

7. A method to clamp a position detector (17) on a support plane in a predetermined lateral position relative to a vehicle (12), said method being characterized in that it comprises the following steps:

providing a positioning plate (19), which is designed to be laid on said support plane, providing a base (173) in the position detector (17), providing magnetic devices (1732) (191) on said flat base (173) and on said positioning plate (19), firmly fixing said positioning plate (19) on the support plane in the predetermined lateral position, arranging said base (173) on the positioning plate (19) so that said magnetic devices (1732) (191) magnetically attract one another, in order to clamp, firmly though in an easily removable manner, the base (173) of the position detector (17) to the positioning plate (19).

8. The method according to claim 7, comprising the steps of:

steadily providing one or more first magnets (1732) on said base (173), steadily providing one or more second magnets (191) on said positioning plate (19), said second magnets (191) have opposite magnetic polarities relative to the polarity of the respective one or more first magnets (1732).

9. The method according to claim 8, comprising the step of arranging said one or more second magnets (191) on the positioning plate (19) so that said one or more second magnets (191) are vertically aligned with the respective one or more first magnets (1732) of the base (173), when the base (173) rests on the positioning plate (19).

10. The method according to claim 9, comprising the steps of:

arranging mechanical members (1731), which are provided with vertical stems going through said base (173), using the mechanical members (1731) to mechanically fix the base (173) on the positioning plate (19).

11. The method according to claim 10, comprising the steps of:

providing said one or more second magnets (191) in respective notches (193) obtained on said positioning plate (19), providing said first magnets (1732) at the lower end of said stems, arranging the base (173) on said positioning plate (19) simultaneously engaging said stems with said first magnets (1732) in said notches (193).

12. The method according to claim 11, comprising the steps of forming a seat (20) on said support plane, placing the positioning plate (19) in said seat (20), fixing the positioning plate (19) to said support plane in said seat (20) through mechanical fixing means (192).

13. A position detector (17) designed to be clamped firmly though in an easily removable manner, on a support plane of a vehicle station in a predetermined lateral position relative to a vehicle (12), characterized in that it comprises:

a positioning plate (19), which is firmly fixed on the support plane in the predetermined lateral position, a flat base (173), which is firmly fixed to said position detector (17) and is designed, in use, to be laid on the positioning plate (19), magnetic means (1732) (191), which are arranged on said flat base (173) and on the positioning plate (19) and are structured so as to magnetically attract one another so as to clamp firmly though in an easily removable manner, the base (173) of the position detector (17) on the positioning plate (19).

14. The position detector (17) according to claim 13, configured to determine the position of a vehicle (12) relative to the target panel (15), which is designed to calibrate ADAS components present in the vehicle (12).

15. The position detector (17) according to claim 14, provided with an alignment sensor (18) to measure the positioning of a vehicle (12) placed in front of at least one target panel (15) suited for the calibration of the ADAS components of said vehicle (12).

* * * * *